Oct. 9, 1956  M. A. MÜLLER  2,766,085
PISTON RINGS
Filed April 15, 1952
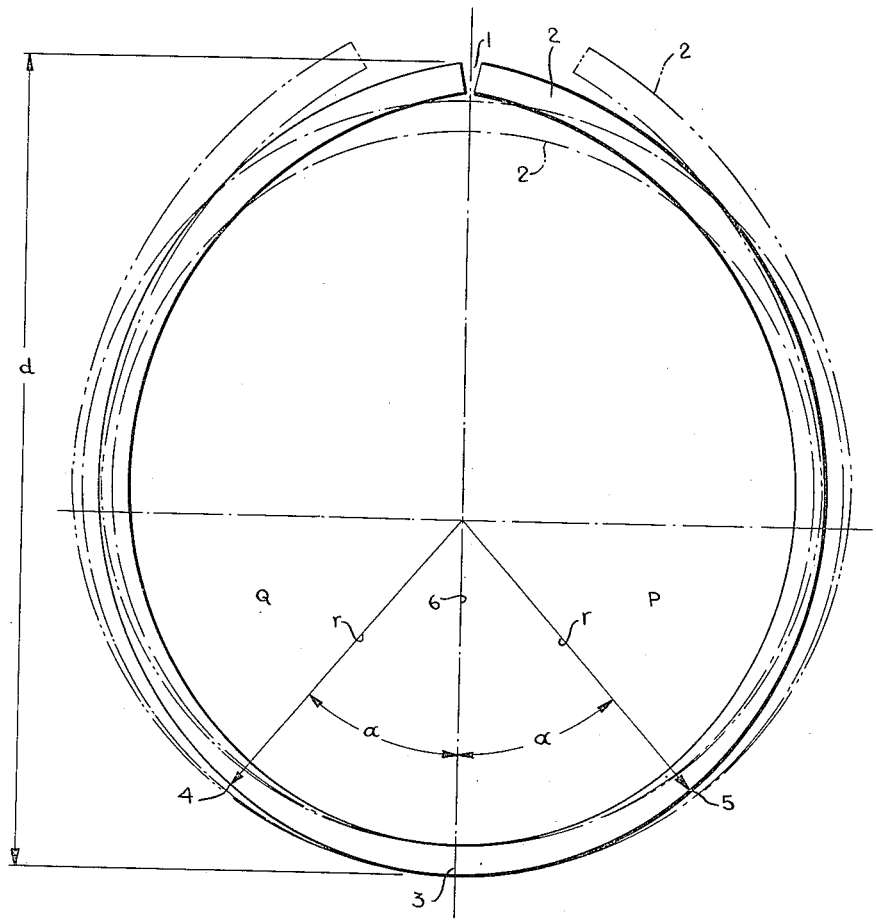
INVENTOR:
MAX. ADOLF MÜLLER,
BY
Freeman & Marmorek,
HIS AGENTS.

United States Patent Office 2,766,085
Patented Oct. 9, 1956

2,766,085

PISTON RINGS

Max Adolf Müller, Koln, Germany, assignor to Goetzewerke Friedrich Goetze Aktiengesellschaft, Burscheid, near Koln, Germany, a corporation of Germany Application April 15, 1952, Serial No. 282,375

Claims priority, application Germany April 18, 1951

2 Claims. (Cl. 309—44)

The invention relates to piston rings.

The customary piston rings are constructed to exert a uniform radial pressure along their entire circumference.

The invention relates to a non-circular piston ring and its unequal circularity is based on the important recognition that the radial pressure distribution of the mounted ring must vary along its circumference in a predetermined manner. In conformity with the above the ring preferably consists of a circular and an oval half section.

The invention will now be described more in detail and with reference to the attached drawing showing a schematic plan view of a piston ring constructed in conformity therewith. The single figure in the drawing is a plan view of a piston ring in accordance with the invention. It shows in solid lines the ring confined in a flexible annulus of a size corresponding to the size of the machine cylinder; it shows in dot-and-dash lines the ring inserted in the machine cylinder; and it shows in double-dot-and-dash lines the ring in its free or unconfined condition.

In the drawing, numeral 2 denotes the piston ring, numeral 1 denotes its gap, numeral 3 its back rest, letter $d$ its diameter and letters Q and P denote the two quadrants of the circular half portion of the ring.

The two sections or places 4, 5 symmetrically arranged in the two quadrants Q, P, where the radius of the ring curvature equals that of the cylinder, may be located in the points of intersection of the axis, which extends vertically to the axis 6 extending through gap 1; however, these parts or points 4, 5 may be symmetrically displaced towards the back rest 3. Preferably these points are symmetrically located within a distance from the back rest 3 corresponding to angles of 48 to 58 degrees.

A piston ring, as described above, which may well be called a non-circular piston ring, has an unequal or different radial pressure distribution in the tensioned state and a variety of essential technical advantages over customary piston rings.

Due to the higher radial pressure of the ring at the gap 1 and due to the equalization of this excess pressure at both sides of the back rest 3 or axis 6, the blow-through of combustion gases between the ring and the cylinder wall caused at critical revolutions is eliminated. The ruptures often experienced in these cases are avoided. The collapse of the joined ends, which causes a corresponding loss of tension and is often observed in practice, is counteracted.

The non-circular or partly circular and partly oval shape of the piston ring resulting from the application of the invention may be produced by turning, grinding or milling in automatic machine tools. The work is carried out with a template, which corresponds to the shape of the freely extending finished ring and separated at the gap 1. This particular shape may be easily mathematically ascertained by observation of the teachings derived from the invention. The separated ring ends are in the template bridged by a filler.

However, if the outer circumference of the piston rings would be made non-circular and if the rings upon removal of the filler, which bridges the gap, are circularly bored, such high tensions will arise during the compression of the rings, that permanent deformations are unavoidable. Such rings already lose a portion of their tension upon being bored.

Therefore, and in order to preserve the unrestricted tension of the rings the same are made non-circular also at the inside; this is done prior to the removal of the ring section corresponding to the gap. The outside and the inside shaping of the ring may be performed simultaneously and without removal of the piston ring from its clamp or support.

In the production of the instant piston rings, the type of the template is important, as highly accurate templates are required.

A piston ring template must have the shape which the piston ring, which is circular after being mounted, possesses prior to its being mounted.

If a steel ring, which has been circularly turned-off at the inside and the outside, is cut open and loaded with two forces tangentially acting at the cut in the spreading direction, the ring assumes a shape, which it should have, if a uniform load of a double total value of the two spreading forces is to recompress the same in its original circular shape. The force required to separate the ring at the gap or cut therefore corresponds to the total of the radial pressures uniformly distributed along its total circumference. In this manner, it is possible to arrive without further calculation to a template, which enables the production of the rings by an automatic machine tool.

If, now, in accordance with the invention the radial pressure is not uniformly distributed and is higher at the gap 1 than at the other parts of the circumference, the above described model ring may still be used as a template, if the rule is observed that the desired radial pressure distribution of the workpiece may be produced without difficulty by an increase or a reduction of the cross section of the model ring at its individual parts of the circumference.

Therefore the following procedure is followed in conformity with the invention for the production of non-circular piston rings.

A template is made from a circular spread ring of which the cross-section is non-uniform along its circumference in conformity with the contemplated distribution of the radial forces. The piston rings are then manufactured by the use of this template in a customary manner in an automatic machine tool.

The non-circular shape of the piston ring 2 is based on the greater length of diameter $d$, which extends through the gap 1 of the ring 2 than that of the diameter of the cylinder, where the piston ring will be mounted, and furthermore on the fact that in the quadrants Q and P symmetrically located at both sides of back rest 3 places 4, 5 are provided where the radius $r$ of the ring curvature equals the radius of curvature of the cylinder, where the ring is mounted. The angles $\alpha$ should preferably be between 48 to 58 degrees.

It will be apparent to those skilled in the art that the novel principles of the invention disclosed herein in connection with specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent, is as follows:

1. A non-circular contractable piston ring for insertion into a machine cylinder, said ring, when confined in a flexible annulus of the size of said cylinder, comprising a center gap containing oval portion and a back-rest forming semi-circular portion having a slightly increasing radius, said gap and back-rest portion being located at diametrically opposed places of the ring circumference, the radius of said semi-circular portion substantially conforming to the radius of the cylinder, the oval portion of the ring having upon its confinement in said annulus a larger diameter measured along the line connecting the gap and the back-rest than the said cylinder and furthermore having sections in each of the two lower quadrants of said semi-circular portion symmetrically located on both sides of the said connecting line where the radius of said semi-circular portion equals the radius of said cylinder.

2. A non-circular contractable piston ring for insertion into a machine cylinder, said ring, when confined in a flexible annulus of the size of said cylinder, comprising a gap containing oval portion and a back-rest forming semi-circular portion having a slightly increasing radius, said gap and back-rest portions being located at diametrically opposed places of the ring circumference, the radius of said semi-circular portion substantially conforming to the radius of the cylinder, the oval portion of the ring having upon its confinement in said annulus a larger diameter measured along the line connecting the gap and the back-rest than the said cylinder, the distance between the center of the ring and the gap being larger than the distance between said center and said back-rest whereby an oval and a semi-circular ring section is formed, the distance between said gap and the center of the ring being larger than the radius of said semi-circular portion and having sections in each of the two lower quadrants of said semi-circular portion symmetrically located on both sides of the said connecting line where the radius of said semi-circular portion equals the radius of said cylinder.

References Cited in the file of this patent

UNITED STATES PATENTS

| | | |
|---|---|---|
| 1,050,102 | Campbell | Jan. 14, 1913 |
| 1,321,539 | Mummert | Nov. 11, 1919 |
| 1,732,630 | Bennet | Oct. 22, 1929 |

FOREIGN PATENTS

| | | |
|---|---|---|
| 440,152 | France | July 3, 1912 |
| 316,225 | Great Britain | July 31, 1930 |